United States Patent
Yoshida

(10) Patent No.: US 11,182,653 B2
(45) Date of Patent: Nov. 23, 2021

(54) EDITING DEVICE, PRINTING SYSTEM AND EDITING METHOD

(71) Applicant: BROTHER KOGYO KABUSHIKI KAISHA, Nagoya (JP)

(72) Inventor: Junjiro Yoshida, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/206,622

(22) Filed: Mar. 19, 2021

(65) Prior Publication Data

US 2021/0303947 A1 Sep. 30, 2021

(30) Foreign Application Priority Data

Mar. 31, 2020 (JP) .............................. JP2020-062814

(51) Int. Cl.
*G06K 15/02* (2006.01)
*G06K 15/00* (2006.01)

(52) U.S. Cl.
CPC ....... *G06K 15/1868* (2013.01); *G06K 15/002* (2013.01); *G06K 15/024* (2013.01)

(58) Field of Classification Search
None
See application file for complete search history.

(56) References Cited

U.S. PATENT DOCUMENTS

2020/0012910 A1* 1/2020 Onoguchi ............ G06K 15/007

FOREIGN PATENT DOCUMENTS

JP 2019-53586 A 4/2019

* cited by examiner

*Primary Examiner* — Lennin R Rodriguezgonzalez
(74) *Attorney, Agent, or Firm* — Kenealy Vaidya LLP

(57) ABSTRACT

A controller of an editing device executes overlapping an input area image on a medium image indicating the printing medium, displaying the medium image and the input area image in a direction in which a width direction of the printing medium and an arrangement direction of the characters coincide with each other, determining whether the characters fit in the input area, when it is determined that the characters do not fit in the input area in the determining, rotating the input area image so that the arrangement direction of the characters in the input area coincides with a longitudinal direction of the printing medium, increasing a size of the input area image in the arrangement direction so that the characters fit in the input area, and displaying the input area image increased in size and the characters arranged in the input area.

17 Claims, 12 Drawing Sheets

EDITING DEVICE, PRINTING SYSTEM AND EDITING METHOD

CROSS REFERENCE TO RELATED APPLICATIONS

This application is based on Japanese Patent Applications No. 2020-062814 filed on Mar. 31, 2020, the entire contents of which are incorporated herein by reference.

TECHNICAL FIELD

The present invention relates to an editing device, a printing system and an editing method for editing characters to be printed on a printing medium.

BACKGROUND ART

JP-A-2019-53586 discloses a printing system including a label printer and an operation terminal. The label printer and the operation terminal are connected so as to be able to communicate with each other. In the printing system, an operator can edit content of a text to be printed on a print label in the label printer by using an editing application executed on the operation terminal. The editing application has a function of reducing a font size of the text in a text object according to the number of characters of the text when the number of characters of the text input by the operator exceeds a display limit of the text object. The label printer creates the print label based on print information or the like generated by the operation terminal when the editing application is executed.

In the printing system described above, a font size of the text to be printed on the print label is reduced as the font size of the text in the text object is reduced. Therefore, as the number of characters of the text desired to be printed by the operator increases, visibility of each text may decrease.

An object of the present invention is to provide an editing device, a printing system and an editing method capable of maintaining visibility of characters even when the number of characters such as characters to printed on a printing medium increases.

SUMMARY OF INVENTION

According to a first aspect of the invention, an editing device includes a controller configured to edit a layout of characters to be printed on an elongated printing medium. The controller executes overlapping an input area image indicating an input area where the characters are arranged on a medium image indicating the printing medium, displaying the medium image and the input area image on a display unit in a direction in which a width direction of the printing medium indicated by the medium image and an arrangement direction of the characters in the input area coincide with each other, determining whether the characters fit in the input area when the characters are arranged in the input area indicated by the input area image displayed in displaying, when it is determined that the characters do not fit in the input area in the determining, rotating the input area image displayed on the display unit so that the arrangement direction of the characters in the input area coincide with a longitudinal direction of the printing medium indicated by the medium image, increasing a size of the input area image rotated in the rotating in the arrangement direction so that the characters fit in the input area, and displaying the input area image increased in size in the increasing and the characters arranged in the input area indicated by the input area image rotated in the rotating.

According to a second aspect of the invention, an editing device includes a controller configured to edit a layout of characters to be printed on an elongated printing medium. The controller executes overlapping an input area image indicating an input area where the characters are arranged on a medium image indicating the printing medium, displaying the medium image and the input area image on a display unit in a direction in which a width direction of the printing medium indicated by the medium image and an arrangement direction of the characters in the input area coincide with each other, calculating a reduction parameter that specifies a reduced size which is set so that the characters having the reduces size fit in the input area when the characters are arranged in the input area indicated by the input area image displayed in the displaying, when the reduction parameter calculated in the calculating satisfies a given condition, rotating the input area image displayed on the display unit so that the arrangement direction coincide with a longitudinal direction of the printing medium indicated by the medium image, increasing a size of the input area image rotated in the rotating in the arrangement direction so that the characters fit in the input area, and displaying the input area image increased in size in the increasing and the characters having a size larger than the size specified by the reduction parameter calculated in the calculating and arranged in the arrangement direction in the input area indicated by the input area image rotated in the rotating.

According to a third aspect of the invention, a printing system includes the editing device in the first aspect or the second aspect, and a printing device that is configured to print the characters on the printing medium based on the layout edited by the editing device.

According to a fourth aspect of the invention, a control method for editing a layout of characters to be printed on an elongated printing medium includes overlapping an input area image indicating an input area where the characters are arranged on a medium image indicating the printing medium, displaying the medium image and the input area image on a display unit in a direction in which a width direction of the printing medium indicated by the medium image and an arrangement direction of the characters in the input area coincide with each other, determining whether characters fit in the input area when the characters are arranged in the input area indicated by the input area image displayed in displaying, when it is determined that the characters do not fit in the input area in the determining, rotating the input area image displayed on the display unit so that the arrangement direction coincide with a longitudinal direction of the printing medium indicated by the medium image, increasing a size of the input area image in the arrangement direction so that the characters fit in the input area indicated by the input area image, and displaying the input area image increased in size in the increasing and the characters arranged in the input area indicated by the input area image rotated in the rotating.

A control method for editing a layout of characters to be printed on an elongated printing medium includes overlapping an input area image indicating an input area where the characters are arranged on a medium image indicating the printing medium, displaying the medium image and the input area image on a display unit in a direction in which a width direction of the printing medium indicated by the medium image and an arrangement direction of the characters in the input area coincide with each other, calculating a reduction parameter that specifies a reduced size which is set so that the characters having the reduced size fit in the input area when the characters are arranged in the input area indicated by the input area image displayed in the displaying, when the reduction parameter calculated in the calculating satisfies a given condition, rotating the input area image displayed on the display unit so that the arrangement direction coincide with a longitudinal direction of the printing medium indicated by the medium image, increasing a size of the input area image rotated in the rotating in the arrangement direction so that the characters fit in the input area, and displaying the input area image increased in size in the increasing and the characters having a size larger than the size specified by the reduction parameter calculated in the calculating and arranged in the arrangement direction in the input area indicated by the input area image rotated in the rotating.

DESCRIPTION OF EMBODIMENTS

<Overview of Printing System 1>

Figure 1:
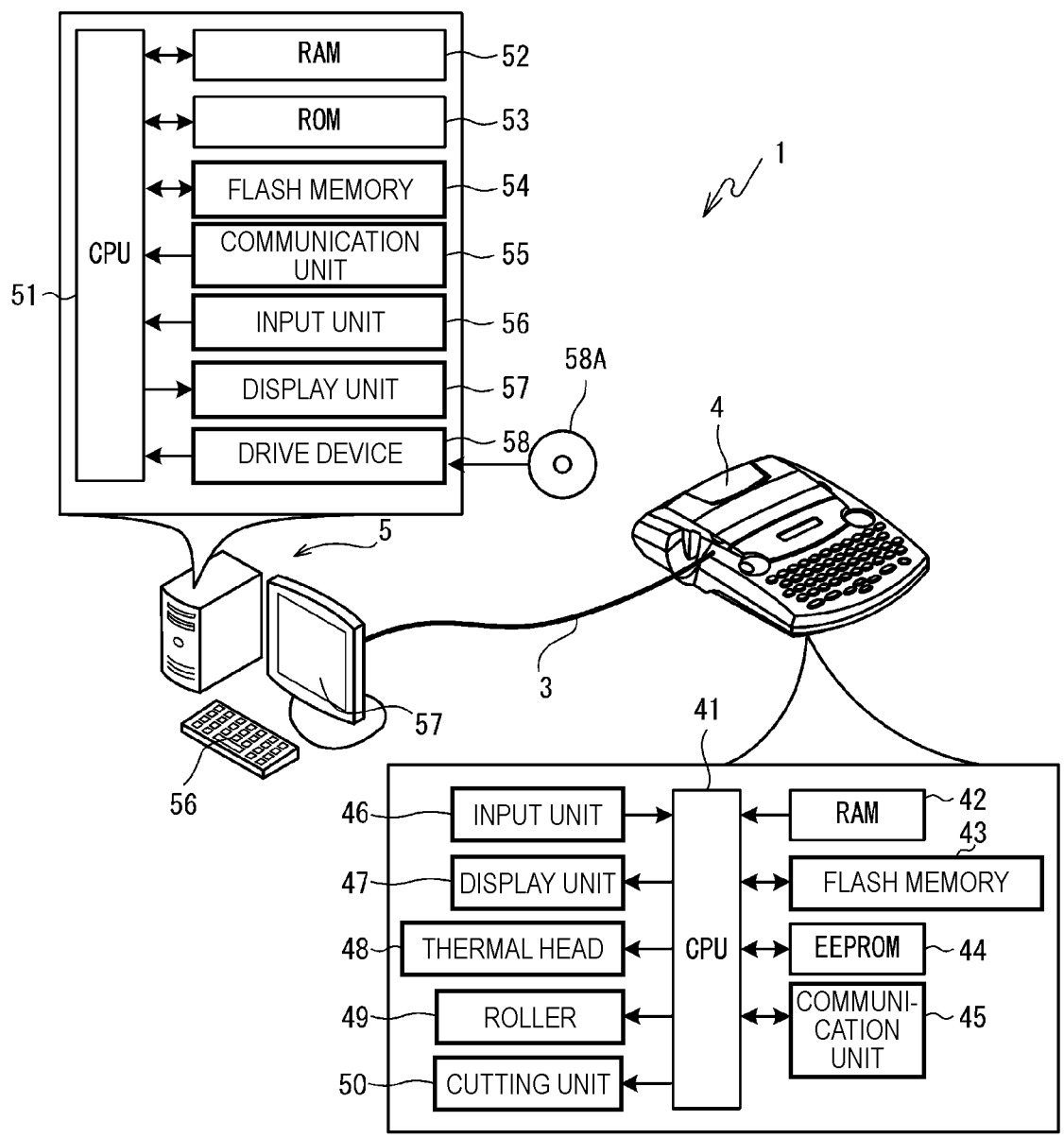
FIG. 1 is a diagram showing an overview of a printing system 1.

Embodiments of the present invention will be described with reference to the drawings. An overview of a printing system 1 will be described with reference to FIG. 1. The printing system 1 includes a printing device 4 and an editing device 5. The printing device 4 is a tape printer that performs printing on a tape that is a printing medium. The tape has an elongated shape, and thermal paper is attached to release paper by an adhesive. A roll around which the tape is wound is mounted on the printing device 4. The printing device 4 feeds out the tape from the mounted roll, and forms a plurality of dots on the tape by a thermal head 48 to perform printing.

The printing device 4 cuts the printed tape by a cutting unit 50. Accordingly, the printing device 4 can create a label on which one or more characters, numbers, codes, symbols, graphics and the like (hereinafter referred to as "characters") are printed. The editing device 5 is a general-purpose personal computer. The printing device 4 and the editing device 5 are connected via a cable 3 and can communicate with each other.

The editing device 5 edits a layout of the characters to be printed on the tape. The editing device 5 generates print data for causing the printing device 4 to perform printing, and transmits the print data to the printing device 4 via the cable 3. The printing device 4 creates the label by performing printing based on the print data transmitted from the editing device 5.

An electrical configuration of the printing device 4 will be described. The printing device 4 includes a CPU 41, a RAM 42, a flash memory 43, an EEPROM 44, a communication unit 45, an input unit 46, a display unit 47, the thermal head 48, a roller 49 and the cutting unit 50. The CPU 41 controls the printing device 4. The CPU 41 is electrically connected to the RAM 42, the flash memory 43, the EEPROM 44, the communication unit 45, the input unit 46, the display unit 47, the thermal head 48, the roller 49 and the cutting unit 50. The RAM 42 stores various types of temporary data. The flash memory 43 stores a program executed by the CPU 41 to control the printing device 4 and the print data received from the editing device 5. Printing dot pattern data for printing the characters is classified and stored in the EEPROM 44 according to the typeface or size. The communication unit 45 is a controller for executing communication with the editing device 5. The input unit 46 is a keyboard. The display unit 47 is an LCD. The thermal head 48 generates heat in response to a signal from the CPU 41, and performs printing on the tape. The roller 49 is a tape feed roller that feeds the tape. The cutting unit 50 includes a cutter provided on a movable cutter holder, and cuts the tape on which the characters are printed by the cutter.

An electrical configuration of the editing device 5 will be described. The editing device 5 includes a CPU 51, a RAM 52, a ROM 53, a flash memory 54, a communication unit 55, an input unit 56, a display unit 57 and a drive device 58. The CPU 51 controls the editing device 5. The CPU 51 is electrically connected to the RAM 52, the ROM 53, the flash memory 54, the communication unit 55, the input unit 56, the display unit 57 and the drive device 58. The RAM 52 stores various types of temporary data. The ROM 53 stores a BIOS and the like. The flash memory 54 stores a program to be executed by the CPU 51 for controlling the editing device 5, an initial setting value, various thresholds and an OS. The communication unit 55 is a controller for executing communication with the printing device 4. The input unit 56 includes a keyboard and a pointing device such as a mouse or a touch pad. The display unit 57 is an LCD. The drive device 58 can read information stored in a computer-readable storage medium 58A such as a semiconductor memory or an optical disk. The CPU 51 can read a program stored in the storage medium 58A by the drive device 58 and store the program in the flash memory 54.

<Overview of Editing Processing by Editing Device 5>

Figure 2:
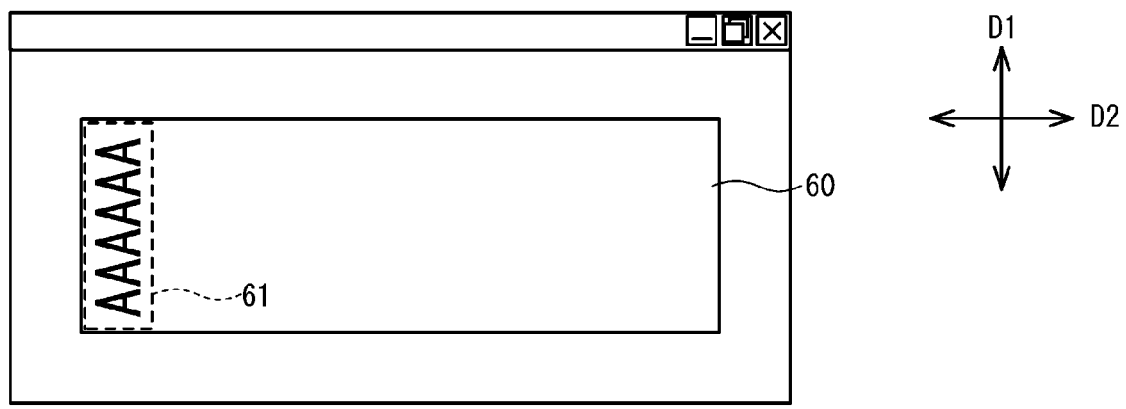
FIG. 2 is a view showing a screen displayed on a display unit 57 when editing processing is executed.

FIG. 2 shows an example of a screen displayed on the display unit 57 (see FIG. 1) when processing of editing the layout of the characters to be printed on the tape (hereinafter referred to as "editing processing") is executed in the editing device 5. A medium image 60 and an input area image 61 indicating an input area are displayed on the display unit 57.

The medium image 60 is an image showing the tape that is the printing medium during printing by the printing device 4. The medium image 60 is a rectangle long in a left-right direction. The left-right direction of the medium image 60 coincides with an elongated direction of the tape. An upper-lower direction of the medium image 60 coincides with a width direction of the tape. A left end of the medium image 60 corresponds to a leading end of the tape. The input area image 61 is arranged so as to overlap the left end of the medium image 60. A length of the input area image 61 in the upper-lower direction is slightly smaller than a length of the medium image 60 in the upper-lower direction. The characters to be printed by the printing device 4 is arranged in the input area image 61. An arrangement direction D1 of the characters arranged in the input area image 61 coincides with the upper-lower direction. Therefore, the arrangement direction D1 of the characters in the input area image 61 coincides with the width direction of the tape indicated by the medium image 60. A position and a size of the input area image 61 are set via the input unit 56 (see FIG. 1) of the editing device 5. A range in which the input area image 61 may be arranged is limited to an area overlapping the medium image 60 so that the characters to be printed do not go out of the tape.

For example, when an input operation of characters "A" is performed a plurality of times via the input unit 56 of the editing device 5, "A" is sequentially arranged from a lower end to an upper end of the input area image 61. Hereinafter, a direction orthogonal to the arrangement direction D1 of the characters is referred to as an "orthogonal direction D2". The orthogonal direction D2 coincides with the left-right direction.

The editing device 5 has functions of automatically adjusting a size of the characters and inserting a line feed as functions related to arrangement of the characters in the input area image 61. Hereinafter, the function of automatically adjusting the size of the characters is referred to as a "size adjustment function". The function of automatically inserting the line feed is referred to as a "line feed function". The size adjustment function is a function of gradually reducing the size of the characters when the characters arranged in the input area image 61 do not fit in the input area image 61 in the arrangement direction D1 or the orthogonal direction D2. The size adjustment function gradually reduces the size of the characters in an order of an initial size (for example, 24 pt), a first size (for example, 22 pt), a second size (for example, 20 pt) . . . an $(N-1)^{th}$ (N is an integer) size (for example, 12 pt), and an $N^{th}$ size (for example, 11 pt). Here, an $n^{th}$ (n is an integer between 1 and N) size corresponds to a size obtained by gradually reducing the initial size by n times. The line feed function is a function of dividing the characters into a plurality of rows by the line feed when the characters arranged in the input area image 61 do not fit in the input area image 61 in the arrangement direction D1.

Figure 3:
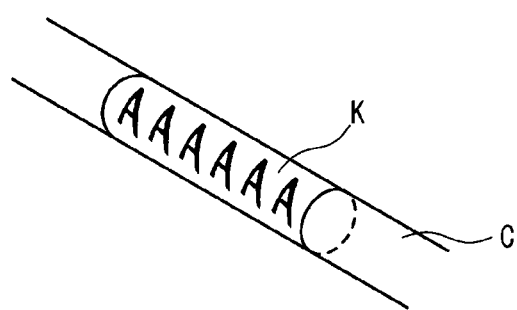
FIG. 3 is a view showing a label K wound around a cable C.

The editing device 5 generates the print data for printing the characters after the input area image 61 is arranged and the characters are arranged in the input area image 61. Hereinafter, arrangement of the input area image 61 and the arrangement of the characters in the input area image 61 are referred to as "the layout of the characters is edited". The printing device 4 performs printing on the tape based on the print data generated by the editing device 5. The printing device 4 cuts a label K (see FIG. 3) that is the printed tape in the width direction. As shown in FIG. 3, the created label K is attached to a cable C by being attached therearound, for example, in a direction in which a longitudinal direction of the cable C coincides with the width direction of the tape.

First Embodiment

Figure 4:
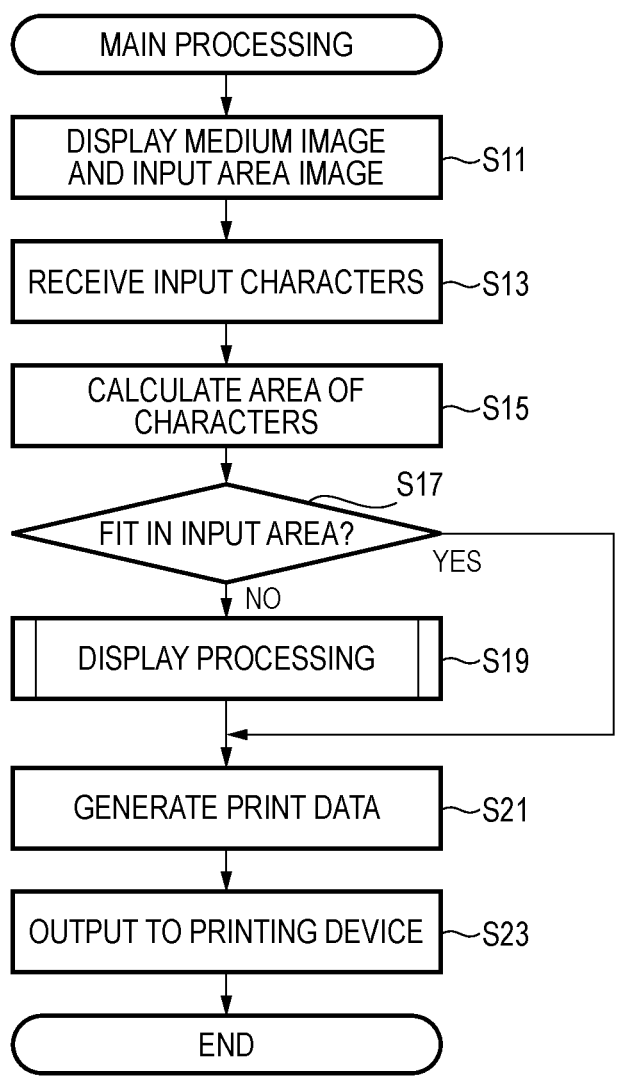
FIG. 4 is a flowchart showing main processing.

A first embodiment will be described with reference to FIGS. 4 to 8. The first embodiment corresponds to the editing processing when the size adjustment function is disabled and the line feed function is disabled. Main processing shown in FIG. 4 is started by the CPU 51 reading and executing the program stored in the flash memory 54 when an instruction to start the editing processing using the editing device 5 is input via the input unit 56. It is assumed that the flash memory 54 stores the initial size as an initial setting value of the size of the characters.

As shown in FIG. 4, the CPU 51 displays the medium image 60 (see FIG. 6) on the display unit 57 (S11). The CPU 51 further displays the input area image 61A corresponding to an input area (see FIG. 6) on the display unit 57 so as to overlap the medium image 60 in response to an input operation via the input unit 56 (S11). At this time, an orientation of the input area image 61A is adjusted so that the arrangement direction D1 of the characters that may be arranged in the input area image 61A coincides with the width direction of the tape indicated by the medium image 60.

The CPU 51 receives characters input via the input unit 56 and stores the characters in the RAM 52 (S13). The CPU 51 calculates a size of an area when the characters stored in the RAM 52 are arranged in the arrangement direction D1 at the initial size (S15). The CPU 51 determines whether the characters having the initial size fit in the input area image 61A in the arrangement direction D1 based on the calculated size of the area (S17). When determining that the characters having the initial size fit in the input area image 61A (S17: YES), the CPU 51 arranges the characters stored in the RAM 52 arranged in the arrangement direction D1 at the initial size in the input area image 61A. The CPU 51 advances the processing to S21.

Figure 6:
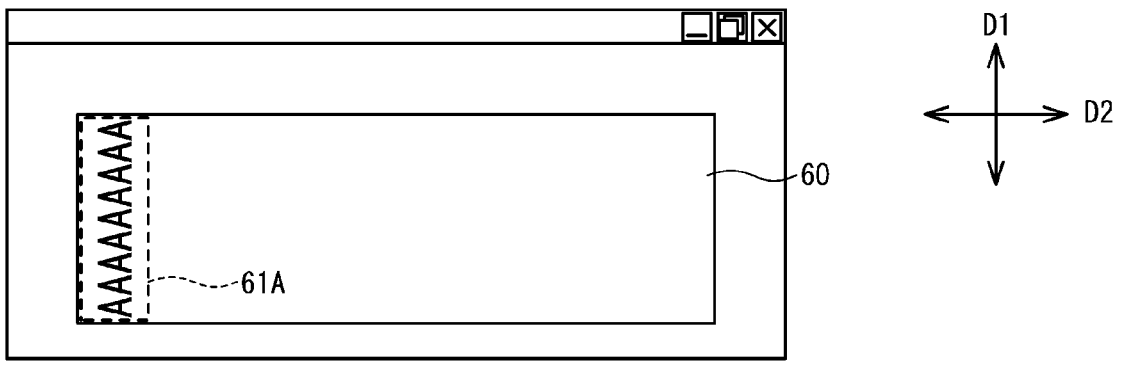
FIG. 6 is a view showing a screen on which an input area image 61A before rotation is displayed.

For example, FIG. 6 illustrates a case where nine characters "A" are input. In this case, when the nine characters "A" are arranged in the arrangement direction D1 at the initial size, the characters fit in the input area image 61A in the arrangement direction D1. Therefore, the CPU 51 arranges the characters having the initial size arranged in the arrangement direction D1 in the input area image 61A, and displays the characters on the display unit 57 so as to overlap the medium image 60.

On the other hand, as shown in FIG. 4, when determining that the characters having the initial size do not fit in the input area image 61A (S17: NO), the CPU 51 executes display processing (see FIG. 5) (S19). For example, when ten characters "A" are input, the ten characters "A" do not fit in the input area image 61A while being arranged in the arrangement direction D1 at the initial size (see FIGS. 6 and 7). In this case, the CPU 51 executes the display processing.

Figure 7:
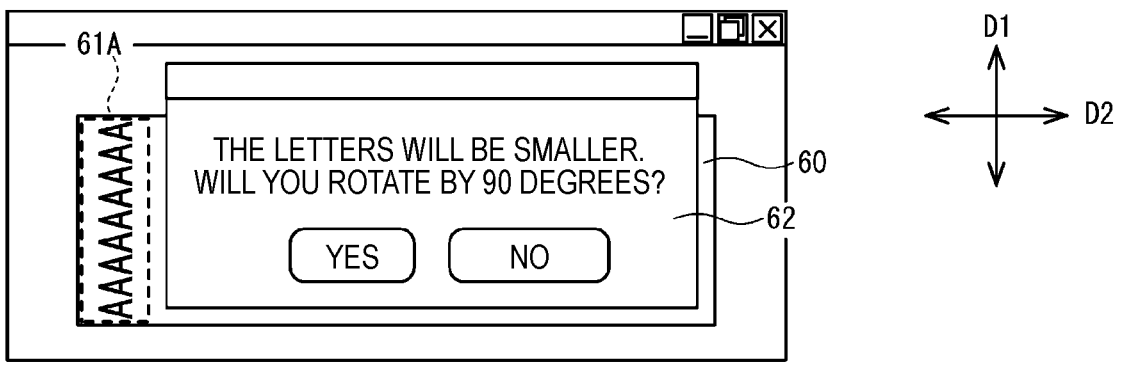
FIG. 7 is a view showing a screen on which an inquiry screen 62 is displayed.
Figure 8:
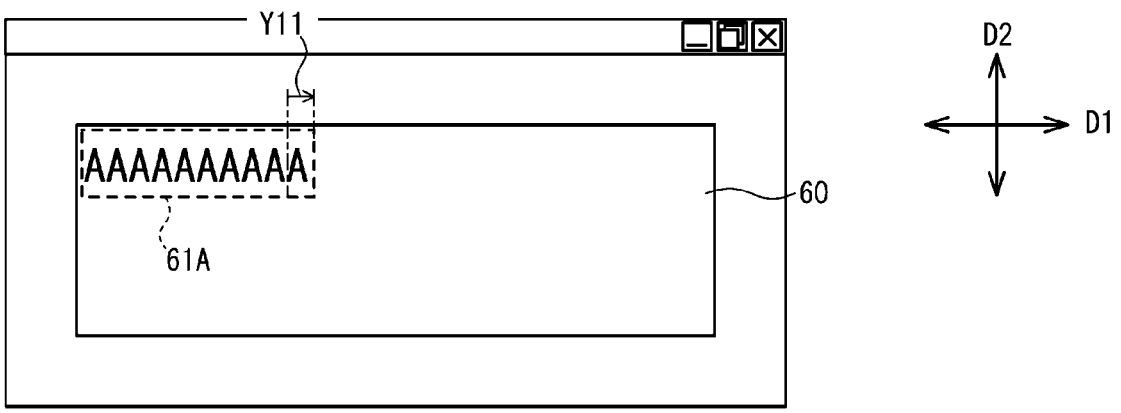
FIG. 8 is a view showing a screen on which the input area image 61A after the rotation is displayed.

The display processing will be described with reference to FIG. 5. The CPU 51 determines whether the input area image 61A is already been rotated by 90 degrees (S31). When determining that the input area image 61A is not rotated by 90 degrees (S31: NO), the CPU 51 displays on the display unit 57 an inquiry screen 62 (see FIG. 7) for inquiring whether to permit rotation of the input area image 61A (S33). When an operation of selecting "YES" on the inquiry screen 62 shown in FIG. 7 is performed via the input unit 56, the CPU 51 determines that an instruction to permit the rotation is input (S35: YES). The CPU 51 rotates the input area image 61A displayed on the display unit 57 by 90 degrees clockwise (S37). As shown in FIG. 8, when the input area image 61A is rotated, a longitudinal direction of the tape indicated by the medium image 60 coincides with the arrangement direction D1 of the characters in the input area image 61A. The input area image 61A after the rotation extends rightward from the left end of the medium image 60.

Figure 5:
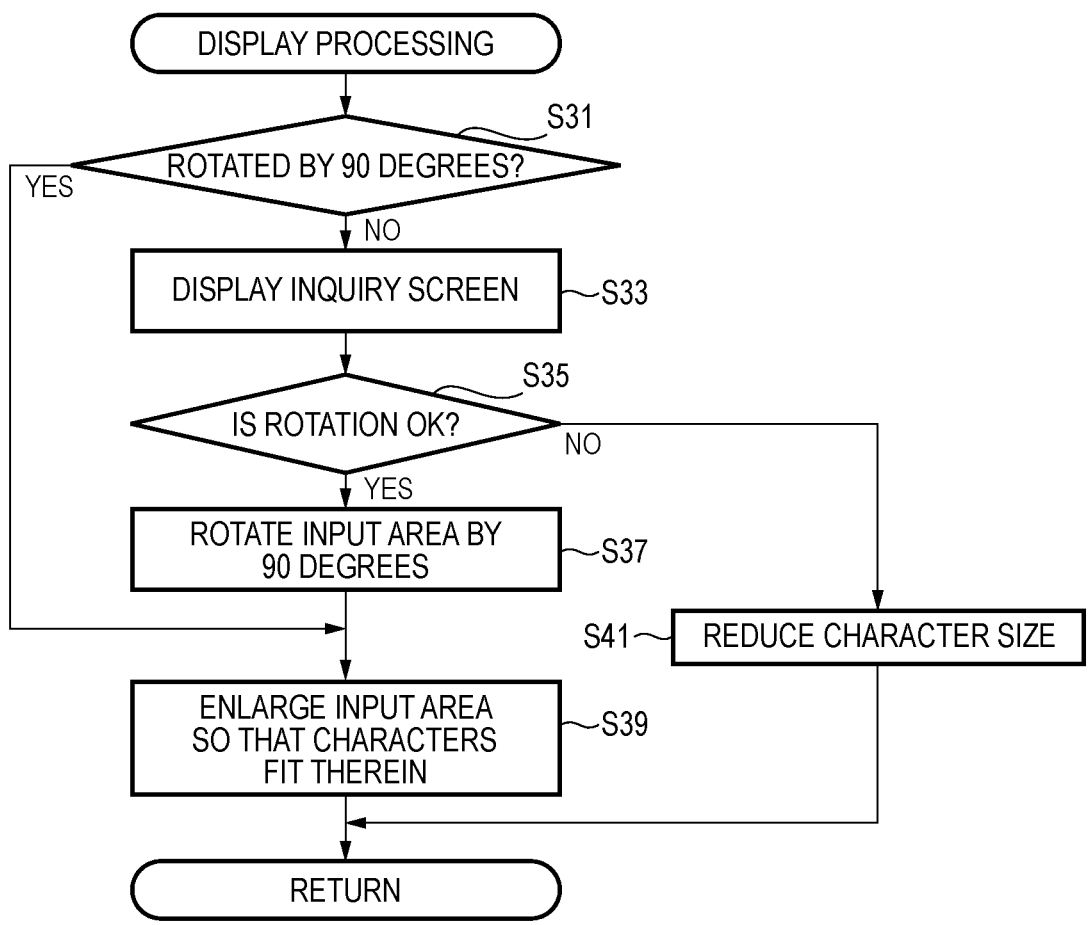
FIG. 5 is a flowchart showing display processing.

As shown in FIG. 5, the CPU 51 displays the characters stored in the RAM 52 arranged in the arrangement direction D1 at the initial size, in the input area image 61A rotated by 90 degrees. At this time, the CPU 51 displays the input area image 61A by increasing a length thereof rightward in the arrangement direction D1 so that the characters fit in the input area image 61A in the arrangement direction D1 (S39, see an arrow Y11 shown in FIG. 8). The CPU 51 ends the display processing and returns to the main processing (see FIG. 4).

On the other hand, when an operation of selecting "NO" on the inquiry screen 62 shown in FIG. 7 is performed via the input unit 56, the CPU 51 determines that an instruction to prohibit the rotation of the input area image 61A is input (S35: NO). The CPU 51 enables the size adjustment function so that the size of the characters may be adjusted. The CPU 51 displays the characters stored in the RAM 52 arranged in the arrangement direction D2. At this time, the CPU 51 reduces the size of the characters so that the characters arranged in the arrangement direction D1 fit in the input area image 61A which has not been rotated (S41). The CPU 51 ends the display processing and returns to the main processing.

When determining that the input area image 61A is already rotated by 90 degrees at a start of the display processing (S31: Yes), the CPU 51 advances the processing to S39 without performing processing of further rotating the input area image 61A by 90 degrees.

As shown in FIG. 4, the CPU 51 specifies a size and a position of the characters to be printed on the tape according to the size of the characters arranged in the input area image 61A and a positional relationship between the characters and the medium image 60. The CPU 51 generates the print data for printing the characters having the specified size at the specified position (S21). The CPU 51 transmits the generated print data to the printing device 4 (see FIG. 1) via the cable 3 (see FIG. 1) (S23). The CPU 51 ends the main processing.

The CPU 41 of the printing device 4 stores the print data received from the editing device 5 via the cable 3 in the flash memory 43. The CPU 41 drives the thermal head 48 and the roller 49 based on the print data stored in the flash memory 43. Thereby, the characters whose layout is edited by the editing device 5 is printed on the tape. The CPU 41 cuts the label K (see FIG. 3) by the cutting unit 50.

Operational Effects of First Embodiment

When the input characters do not fit in the input area image 61A, the editing device 5 rotates the input area image 61A by 90 degrees (S37) so that the longitudinal direction of the tape in the medium image 60 coincides with the arrangement direction D1 of the characters. After the rotation of the input area image 61A, the editing device 5 enlarges the length of the input area image 61A in the arrangement direction D1 so that the input characters fit in the input area image 61A (S39). In this case, even when the number of characters to be printed on the tape increases, the editing device 5 does not need to reduce the size of the characters. Therefore, the editing device 5 may cause the characters to be printed at a position of the tape corresponding to the input area image 61A while maintaining visibility of the characters. Even when the characters do not fit in the input area image 61A in the arrangement direction D1, the editing device 5 may cause the characters to be printed on the tape at the initial size by rotating the input area image 61A by 90 degrees to increase the length in the arrangement direction D1.

Second Embodiment

Figure 9:
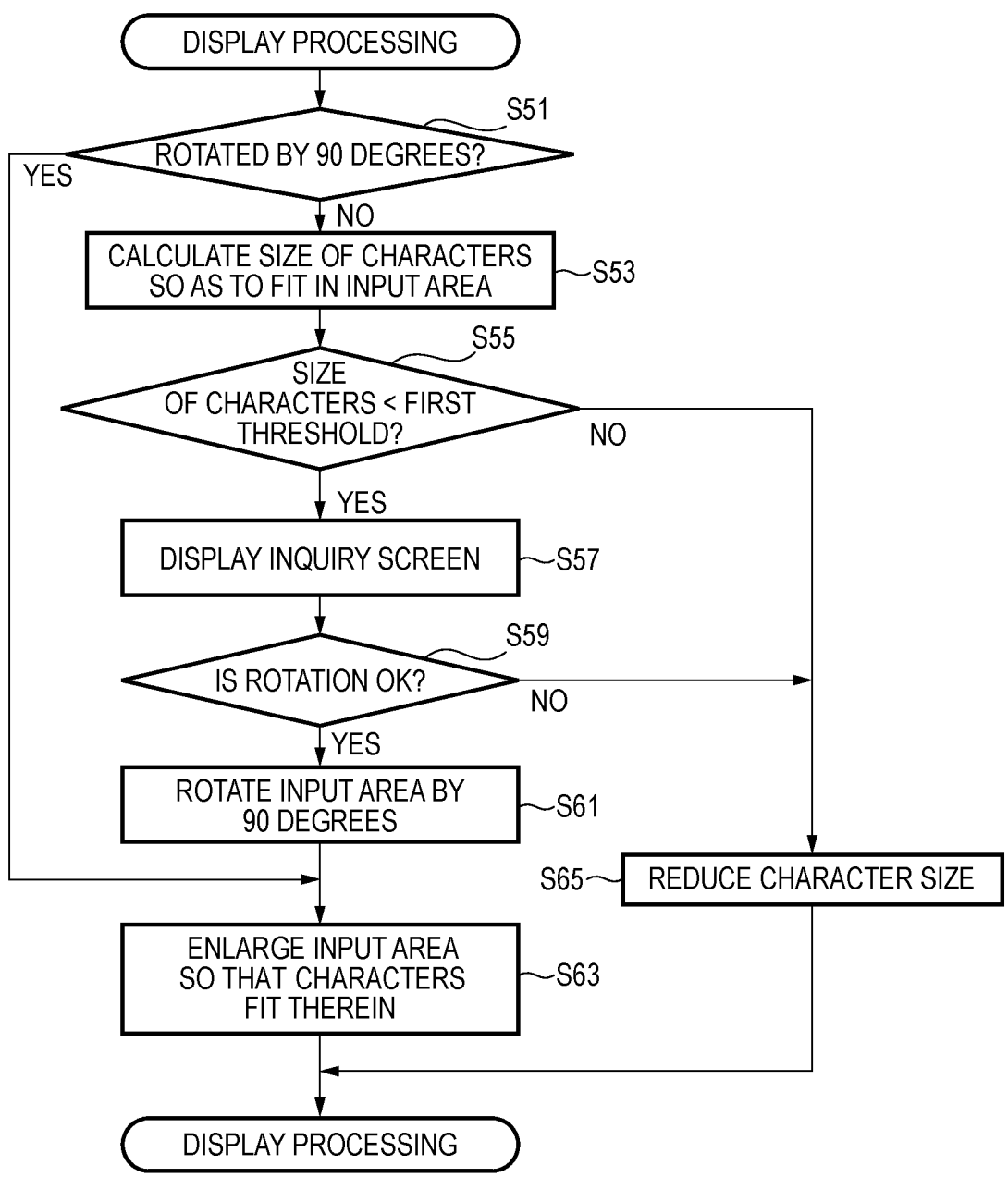
FIG. 9 is a flowchart showing display processing.

A second embodiment will be described with reference to FIGS. 9 to 11. The second embodiment corresponds to the editing processing when the size adjustment function is validated and the line feed function is disabled. Since the main processing executed in the second embodiment is the same as the main processing (see FIG. 4) in the first embodiment, the description thereof will be omitted. In the second embodiment, when the processing of S19 (see FIG. 4) in the main processing is executed, the display processing shown in FIG. 9 is executed instead of the display processing shown in FIG. 5. It is assumed that the flash memory 54 stores a first threshold as a threshold of the size of the characters.

The display processing will be described with reference to FIG. 9. The CPU 51 determines whether an input area image 61B indicating an input area (see FIG. 10) is already rotated by 90 degrees (S51). When determining that the input area image 61B is already rotated by 90 degrees at a start of the display processing (S51: Yes), the CPU 51 advances the processing to S63 without performing processing of further rotating the input area image 61B by 90 degrees.

When determining that the input area image 61B is not rotated by 90 degrees (S51: No), CPU 51 advances the processing to S53. The CPU 51 calculates a size when the characters stored in the RAM 52 are reduced so as to fit in the input area image 61B in a state of being arranged in the arrangement direction D1 (S53). Specifically, for example, when ten characters "A" input via the input unit 56 do not fit in the input area image 61B while being arranged in the arrangement direction D1 at the initial size, the CPU 51 reduces the size each time by one step from the initial size, and repeatedly determines whether the characters having the reduced size fit in the input area image 61B. The CPU 51 repeats stepwise reduction of the size of the characters until the characters having the reduced size fit in the input area image 61B. The size when the characters fit in the input area image 61B corresponds to the size calculated by the processing of S53.

The CPU 51 compares the calculated size with the first threshold (S55). When determining that the size of the reduced characters is equal to or larger than the first threshold (S55: NO), the CPU 51 reduces the characters to the calculated size (S65) and arranges the reduced characters arranged in the arrangement direction D1 in the input area image 61B. The CPU 51 ends the display processing.

Figure 10:
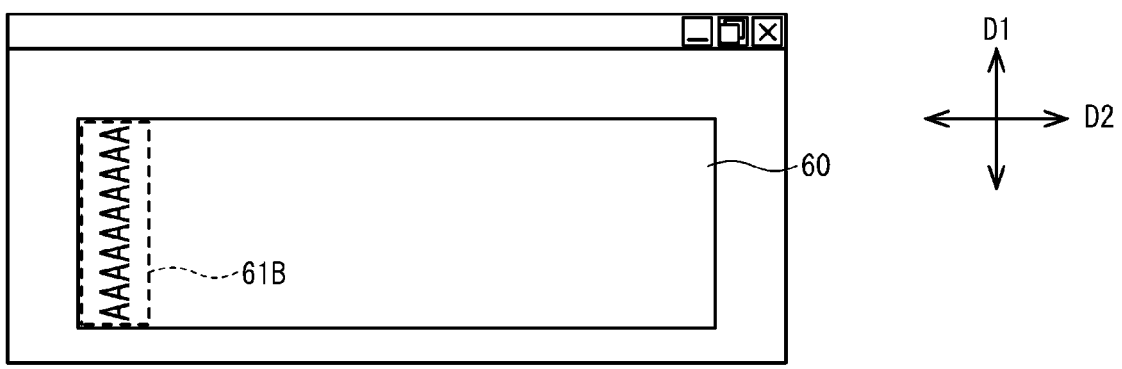
FIG. 10 is a view showing a screen on which an input area image 61B before rotation is displayed.
Figure 11:
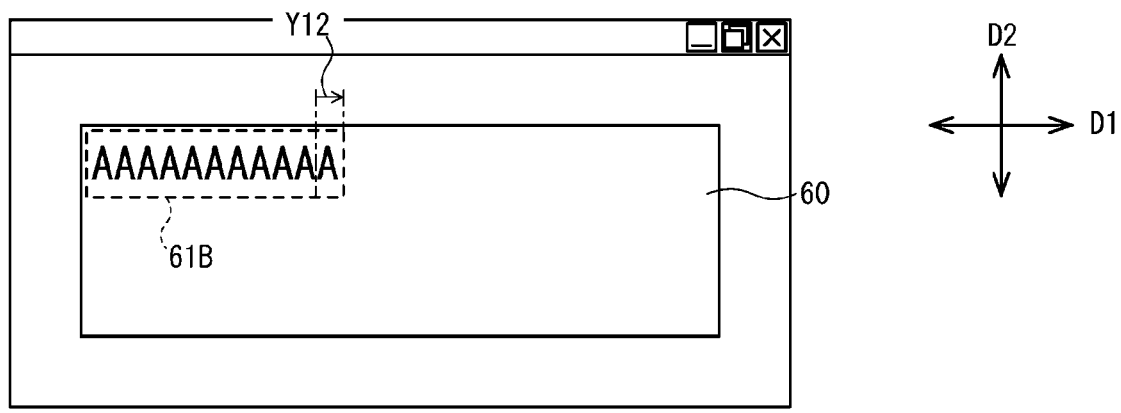
FIG. 11 is a view showing a screen on which the input area image 61B after the rotation is displayed.

For example, as shown in FIG. 10, when the characters having the $n^{th}$ size are arranged in the arrangement direction D1 in the input area image 61B, it is assumed that the characters fit in the input area image 61B. When the $n^{th}$ size is equal to or larger than the first threshold (S55: NO), the CPU 51 reduces the characters to the $n^{th}$ size (S65) and arranges the reduced characters arranged in the arrangement direction D1 in the input area image 61B.

On the other hand, as shown in FIG. 9, when determining that the size calculated by the processing of S53, that is, the $n^{th}$ size is smaller than the first threshold (S55: YES), the CPU 51 advances the processing to S57. The CPU 51 displays on the display unit 57 the inquiry screen 62 (see FIG. 7) for inquiring whether to permit rotation of the input area image 61B (S57). When an instruction to permit the rotation of the input area image 61B is input (S59: YES), the CPU 51 rotates the input area image 61B displayed on the display unit 57 by 90 degrees clockwise (S61).

The CPU 51 reduces the characters stored in the RAM 52 to a size that is one step larger than the $n^{th}$ size, that is, an $(n-1)^{th}$ size, and displays the characters arranged in the arrangement direction D1, in the input area image 61B rotated by 90 degrees. The $(n-1)^{th}$ size is equal to or larger than the first threshold. The CPU 51 displays the input area image 61B by increasing a length thereof rightward in the arrangement direction D1 so that the characters fit in the input area image 61B in the arrangement direction D1 (S63, see an arrow Y12 shown in FIG. 11). The CPU 51 ends the display processing and returns to the main processing (see FIG. 4).

On the other hand, when an instruction to prohibit the rotation of the input area image 61B is input (S59: NO), the CPU 51 displays the characters stored in the RAM 52 arranged in the arrangement direction D1 in the input area image 61B. At this time, the CPU 51 reduces the characters to the $n^{th}$ size so that the characters fit in the input area image 61B in the arrangement direction D1 (S65). The CPU 51 ends the display processing and returns to the main processing (see FIG. 4).

Operational Effects of Second Embodiment

The editing device 5 can increase the number of characters arranged in the input area image 61B by reducing the size of the characters displayed in the input area image 61B. Therefore, the editing device 5 can increase the number of characters that can be printed on the tape. When the size of the reduced characters is smaller than the first threshold (S55: YES), the editing device 5 rotates the input area image 61B (S61) and enlarges the length of the input area image 61B in the arrangement direction D1 (S63). At this time, the size of the characters arranged in the input area image 61B is larger than the first threshold. Therefore, the editing device 5 can prevent the size of the characters to be printed on the tape from becoming too small and the visibility from decreasing. That is, the editing device 5 can reduce the characters within a range in which the visibility of the characters does not decrease.

Third Embodiment

A third embodiment will be described. The third embodiment is different from the second embodiment in the processing of S53, S55 of the display processing (see FIG. 9). Other processing is the same as that of the second embodiment. Hereinafter, the same processing as that of the second embodiment will be omitted. It is assumed that the flash memory 54 stores a second threshold as a threshold of a size ratio.

As shown in FIG. 9, when determining that the input area image 61B is not rotated by 90 degrees (S51: NO), the CPU 51 advances the processing to S53. The CPU 51 calculates a size when the characters stored in the RAM 52 are reduced so as to fit in the input area image 61B in a state of being arranged in the arrangement direction D1 (S53). The CPU 51 further calculates a ratio of the calculated size after reduction (the $n^{h}$ size) to the size of the characters before reduction, that is, the initial size (S53). The CPU 51 compares the calculated ratio with the second threshold (S55). When determining that the calculated ratio is equal to or larger than the second threshold (S55: NO), the CPU 51 reduces the characters according to the calculated ratio (S65) and arranges the reduced characters arranged in the arrangement direction D1 in the input area image 61B.

When determining that the ratio calculated by the processing of S53 is smaller than the second threshold (S55: YES), the CPU 51 advances the processing to S57. When an instruction to permit the rotation of the input area image 61B is input via the input unit 56 (S59: YES), the CPU 51 rotates the input area image 61B displayed on the display unit 57 by 90 degrees clockwise (S61). The CPU 51 reduces the characters stored in the RAM 52 to the $(n-1)^{th}$ size and displays the characters arranged in the arrangement direction D1, in the input area image 61B rotated by 90 degrees. The CPU 51 displays the input area image 61B by increasing the length thereof in the arrangement direction D1 so that the characters fit in the input area image 61B in the arrangement direction D1 (S63).

Operational Effects of Third Embodiment

Figure 12:
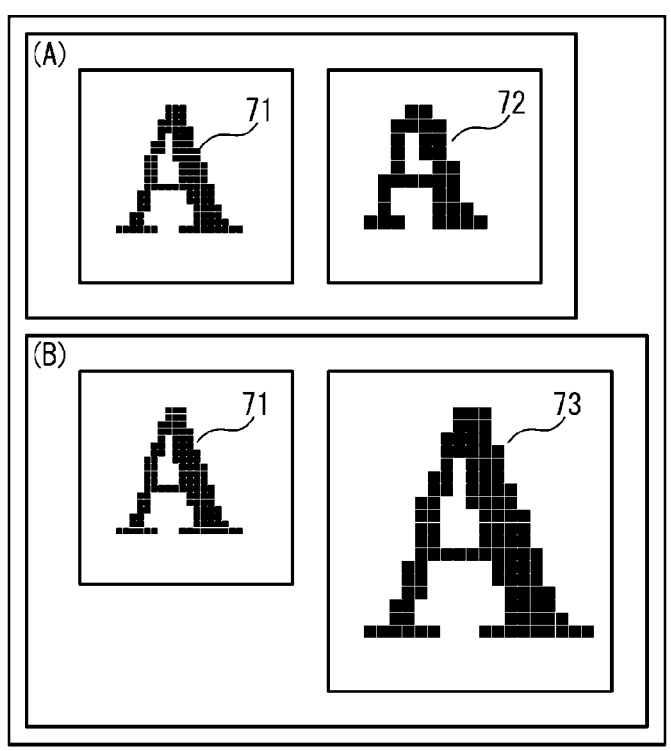
FIG. 12 is a view showing characters 71 to 73 displayed on the display unit 57.

For example, there is a case where printing is performed using a first printing device having a relatively large resolution during printing, and a case where printing is performed using a second printing device having a relatively small resolution during printing. In this case, when characters having the same size are printed using the first printing device and the second printing device, as shown in FIG. 12A, in comparison with a character 71 printed by the first printing device as shown in (A) of FIG. 12, unevenness of pixels appears remarkably in a character 72 printed by the second printing device, and visibility decreases. Therefore, as shown in (B) of FIG. 12, when a size of a character 73 printed by the second printing device is set to be larger than a size of the character 71 printed by the first printing device, it is preferable since visibility when an user visually recognizes the printed character is maintained.

In this case, for example, when a character to be printed by the first printing device is edited, a relatively small value (for example, the size of character 71) is set as an initial size of the character set in the editing device 5, and when a character to be printed by the second printing device is edited, a relatively large value (for example, the size of the character 73) is set as an initial size of the character set in the editing device 5. Hereinafter, the initial size set when the character to be printed by the first printing device is edited is called a "first initial size" and referred to as "S1". The initial size set when the character to be printed by the second printing device is edited is called a "second initial size" and referred to as "S2". In this case, a relationship of "S1<S2" is established.

Here, a case where display in the second embodiment is executed will be taken as an example. In the second embodiment, as shown in FIG. 10, the size is reduced so that the characters fit in the input area image 61B before the rotation. Then, when the reduced $n^{th}$ size is smaller than the first threshold, as shown in FIG. 11, the input area image 61B is rotated and the size of the characters is set to the $(n-1)^{th}$ size. That is, the size of the characters arranged in the input area image 61B after the rotation is always the $(n-1)^{th}$ size. Therefore, the sizes of characters printed by the first printing device and the second printing device are the same, and in some cases, the visibility of the character printed by the second printing device may be deteriorated.

Figure 13:
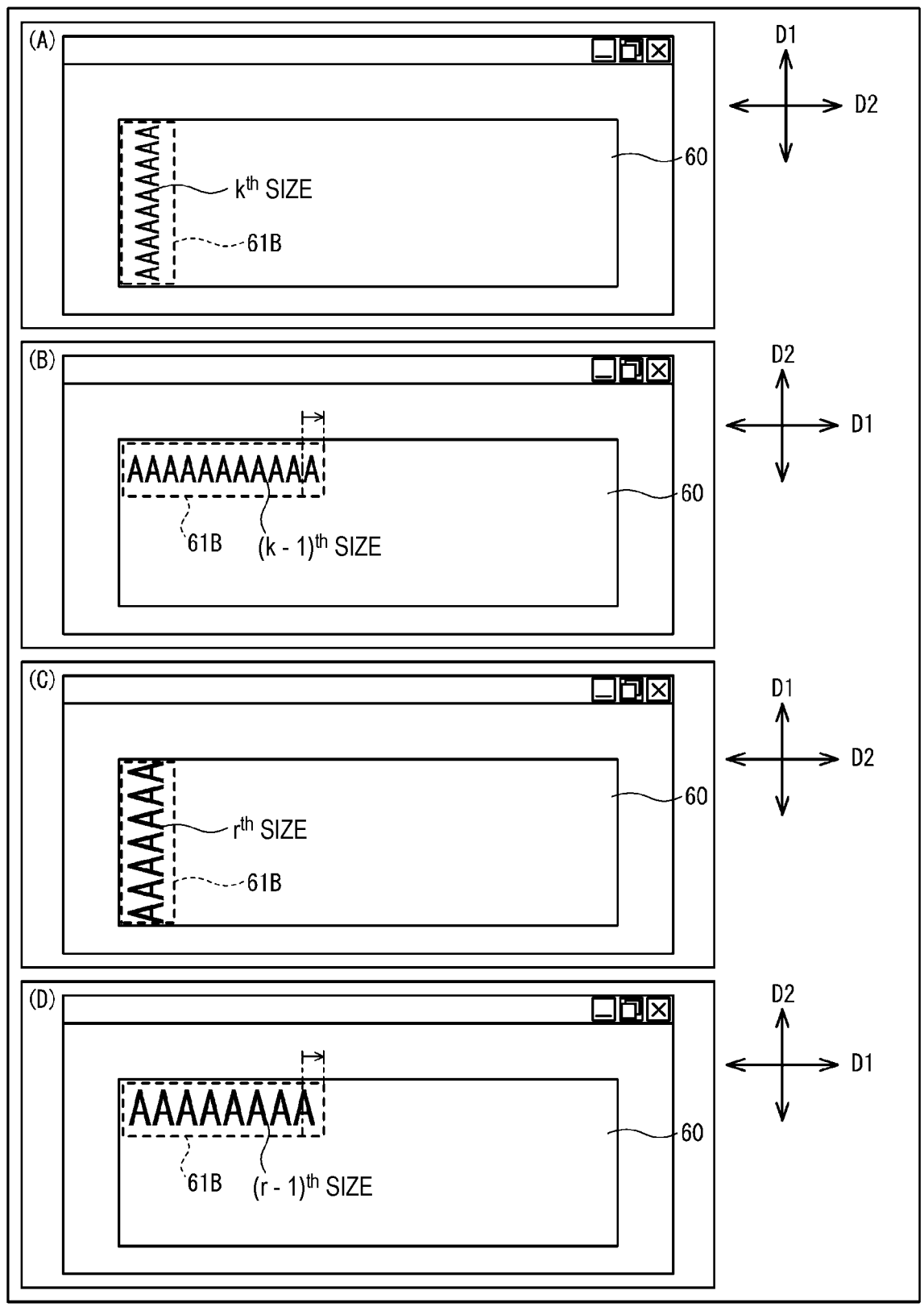
FIG. 13 is a view showing a screen on which the input area image 61B before and after the rotation is displayed.

On the other hand, in the third embodiment, the ratio of the reduced size to the initial size is compared with the first threshold. Here, it is assumed that the first initial size is set as the initial size, and the size is reduced so that the characters fit in the input area image 61B before the rotation. As shown in FIG. 13A, a ratio "k/S1" of the size of the reduced characters (referred to as a "$k^{th}$ (k is an integer) size") to the initial size is smaller than the first threshold, and as shown in FIG. 13B, the input area image 61B is rotated and the size of the characters is set to a $(k-1)^{th}$ size.

On the other hand, it is assumed that the second initial size is set as the initial size, and the size is reduced so that the characters fit in the input area image 61B before the rotation. As shown in FIG. 13C, a ratio "r/S2" of the size of the reduced characters (referred to as an "$r^{th}$ (r is an integer) size") to the initial size is smaller than the first threshold, and as shown in FIG. 13D, the input area image 61B is rotated and the size of the characters is set to an $(r-1)^{th}$ size.

Here, since the second initial size is larger than the first initial size (S1<S2), as the size of the characters arranged in the input area image 61B after the rotation, the size of the characters (the $(r-1)^{th}$ size) when the second initial size is set is larger than the size of the characters (the $(k-1)^{th}$ size) when the first initial size is set.

Therefore, according to the third embodiment, even when a value of the first threshold is commonly used by adjusting the initial size, the editing device 5 can cause the printing device 4 to print the characters having an optimal size according to a printable resolution in the printing device 4.

Fourth Embodiment

Figure 14:
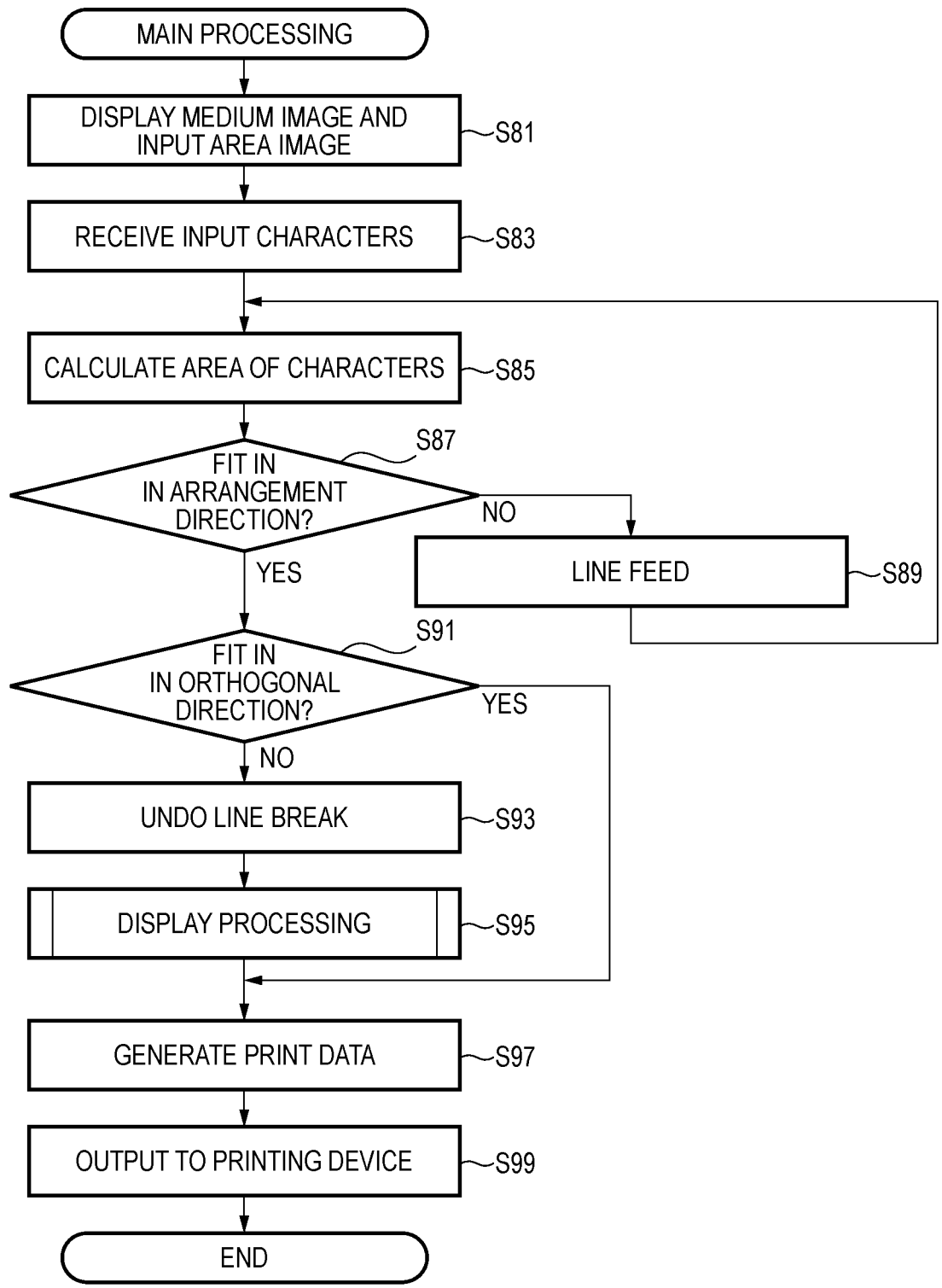
FIG. 14 is a flowchart showing main processing.

A fourth embodiment will be described with reference to FIGS. 14 to 19. The fourth embodiment corresponds to the editing processing when the size adjustment function is validated and the line feed function is validated. The main process shown in FIG. 14 is started by the CPU 51 reading and executing the program stored in the flash memory 54 when the instruction to start the editing processing using the editing device 5 is input via the input unit 56. It is assumed that the flash memory 54 stores the initial size as an initial setting value of the size of the characters.

As shown in FIG. 14, the CPU 51 displays the medium image 60 on the display unit 57 (S81). The CPU 51 further displays an input area image 61C indicating an input area (see FIG. 15) on the display unit 57 so as to overlap the medium image 60 (S81). The input area image 61C displayed here is larger in the left-right direction than the input areas 61A, 61B. The CPU 51 receives characters input via the input unit 56 and stores the characters in the RAM 52 (S83). The CPU 51 calculates a size of an area when the characters stored in the RAM 52 are arranged in the arrangement direction D1 at the initial size (S85).

The CPU 51 determines whether the characters having the initial size fit in the input area image 61C in the arrangement direction D1 based on the calculated size of the area (S87). When determining that the characters having the initial size do not fit in the input area image 61C in the arrangement direction D1 (S87: NO), the CPU 51 advances the processing to S89. The CPU 51 inserts a line feed into one or more positions between the characters so that the characters having the initial size fit in the input area image 61C in the arrangement direction D1 (S89). The CPU 51 returns the processing to S85.

Figure 15:
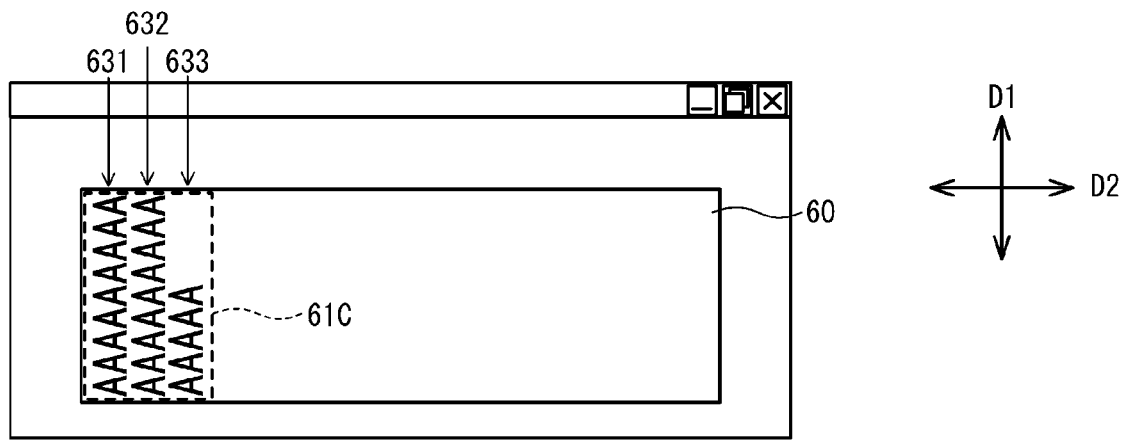
FIG. 15 is a view in which a first row 631 to a third row 633 are arranged in an input area image 61C before rotation.

For example, FIG. 15 illustrates a case where 23 input characters "A" do not fit in the input area image 61C while being arranged in the arrangement direction D1 at the initial size. In this case, line feeds are respectively inserted between the ninth character "A" and the tenth character "A", and between the eighteenth character "A" and the nineteenth character "A" (S89). The first to ninth characters "A", the tenth to eighteenth characters "A", and the nineteenth to twenty-third characters "A" each form a row of characters that fit in the input area image 61C while being arranged in the arrangement direction D1.

Hereinafter, a row arranged in the input area image 61C is referred to as an $m^{th}$ (m is an integer) row. A row formed by the first to ninth characters "A" corresponds to a first row 631. A row formed by the tenth to eighteenth characters "A" corresponds to a second row 632. A row formed by the nineteenth to twenty-third characters "A" corresponds to a third row 633. The first row 631, the second row 632 and the third row 633 are arranged in the orthogonal direction D2 orthogonal to the arrangement direction D1.

As shown in FIG. 14, the CPU 51 calculates a size of an area when the rows formed by inserting the line feed are arranged in the orthogonal direction D2 in the input area image 61C (S85). The CPU 51 determines whether the characters fit in the input area image 61C in the arrangement direction D1 based on the calculated size of the area (S87). When the line feed is inserted by the processing of S89, it is determined that the characters fit in the input area image 61C in the arrangement direction D1 (S87: YES). Next, the CPU 51 determines whether the characters fit in the input area image 61C in the orthogonal direction D2 (S91). Even when a plurality of rows of characters are arranged in the orthogonal direction D2, the CPU 51 determines that the character fit in the input area image 61C in the orthogonal direction D2 (S91: YES) and advances the processing to S97.

Figure 16:
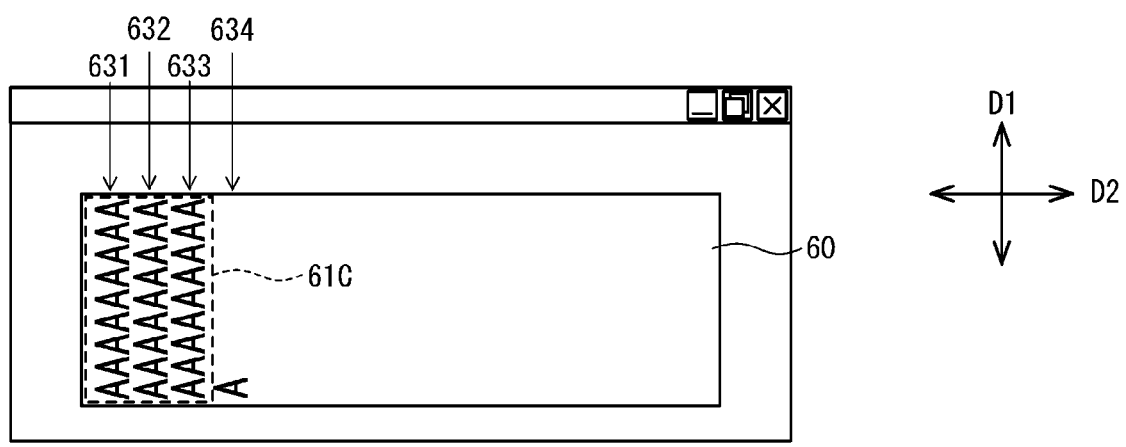
FIG. 16 is a view in which the first row 631 to a fourth row 634 are arranged in the input area image 61C before the rotation.
Figure 17:
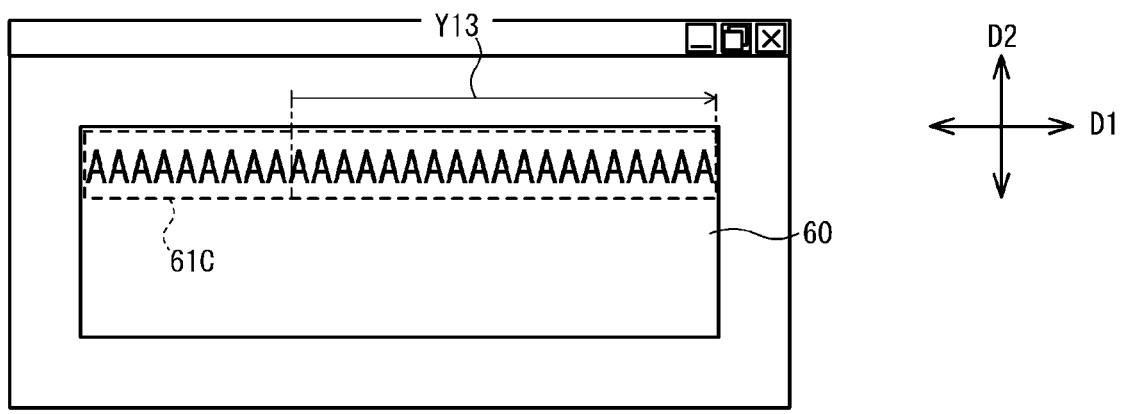
FIG. 17 is a view showing a screen on which the input area image 61C after the rotation is displayed.

For example, FIG. 16 illustrates a case where the first row 631 to the fourth row 634 are formed in response to an input of 28 characters "A". In this case, the fourth row 634 does not fit in the input area image 61C and goes rightward out of the input area image 61C. As shown in FIG. 14, when determining that the characters do not fit in the input area image 61C in the orthogonal direction D2 as a result of forming a plurality of rows in response to insertion of the line feed (S91: NO), the CPU 51 advances the processing to S93. When the line feed is inserted between the characters by the processing of S89, the CPU 51 deletes the inserted line feed and returns to an original state (S93). The CPU 51 executes the display processing (see FIGS. 5 and 9) (S95). The display processing executed by the processing of S95 is the same as the display processing executed in the first to third embodiments (see FIGS. 5 and 9).

For example, when the display processing shown in FIG. 5 is executed, the CPU 51 rotates the input area image 61C displayed on the display unit 57 by 90 degrees clockwise (S37), and displays the characters stored in the RAM 52 arranged in the arrangement direction D1 at the initial size in the rotated input area image 61C. At this time, the CPU 51 displays the input area image 61C by increasing a length thereof in the arrangement direction D1 so that the characters fit in the input area image 61C in the arrangement direction D1 (S39, see an arrow Y13 shown in FIG. 17).

For example, when the display processing shown in FIG. 9 is executed, the CPU 51 calculates a size when the characters stored in the RAM 52 are reduced so as to fit in the input area image 61C in the arrangement direction D1 and the orthogonal direction D2 (S53). Specifically, when the initial size stored in RAM 52 does not fit in the input area image 61C when arranged in the arrangement direction D1, the CPU 51 reduces the size by one step from the initial size. The CPU 51 inserts a line feed into one or more positions between the reduced characters so that the characters fit in the input area image 61C in the arrangement direction D1. The CPU 51 determines whether the characters having the reduced size fit in the input area image 61C in the arrangement direction D1 and the orthogonal direction D2. The CPU 51 repeats stepwise reduction of the size of the characters and insertion of the line feed until the characters having the reduced size fit in the input area image 61C in the arrangement direction D1 and the orthogonal direction D2. The size when the characters fit in the input area image 61C corresponds to the size calculated by the processing of S53.

Figure 18:
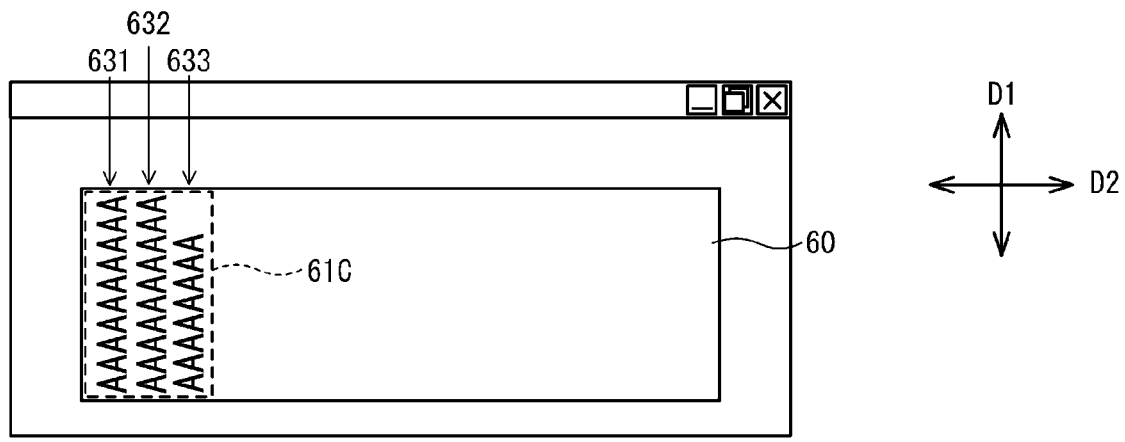
FIG. 18 is a view in which reduced characters are arranged in the input area image 61C before the rotation.
Figure 19:
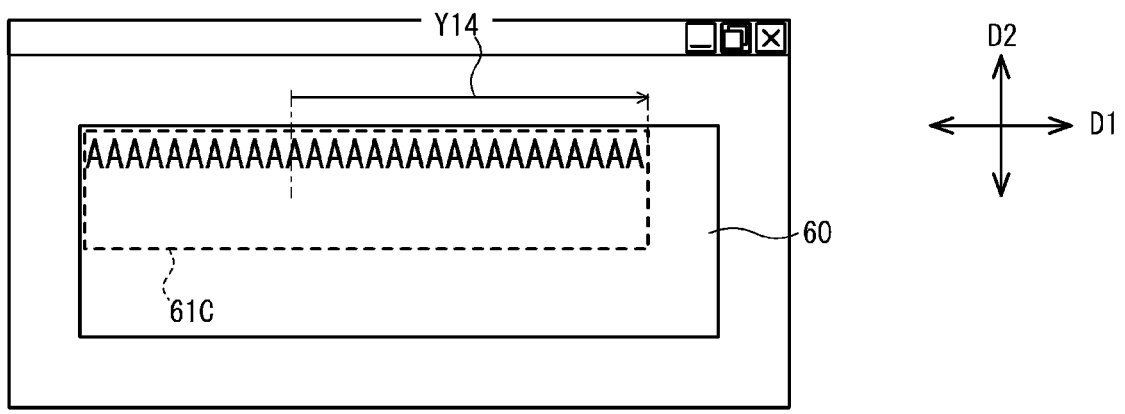
FIG. 19 is a view in which the reduced characters are arranged in the input area image 61C after the rotation.

For example, as shown in FIG. 18, when the characters having the $n^{th}$ size are arranged in the arrangement direction D1 in the input area image 61C, the first row 631 including the first to tenth characters "A", the second row 632 including the eleventh to twentieth characters "A", and the third row 633 including the twenty-first to twenty-eighth characters "A" are formed. The first row 631 to the third row 633 include 28 characters "A" and fit in the input area image 61C in the arrangement direction D1 and the orthogonal direction D2.

As shown in FIG. 9, when determining that the size of the reduced characters calculated by the processing of S53, that is, the $n^{th}$ size is smaller than the first threshold (S55: YES), the CPU 51 rotates the input area image 61C displayed on the display unit 57 by 90 degrees clockwise (S61).

The CPU 51 reduces the characters stored in the RAM 52 to the $(n-1)^{th}$ size that is one step larger than the $n^{th}$ size, and arranges the characters arranged in the arrangement direction D1 in the input area image 61C rotated by 90 degrees. At this time, the line feed inserted between the characters is deleted. The $(n-1)^{th}$ size is equal to or larger than the first threshold. The CPU 51 displays the input area image 61C by increasing the length thereof in the arrangement direction D1 so that the characters fit in the input area image 61C in the arrangement direction D1 (S63, see an arrow Y14 shown in FIG. 19).

Operational Effects of Fourth Embodiment

When the line feed is inserted between the characters to form the rows of characters and the characters do not fit in the input area image 61C in the orthogonal direction D2, the editing device 5 can rotate the input area image 61C to increase the length in the arrangement direction D1 (S37, S39). Here, the editing device 5 executes the display processing shown in FIG. 5, whereby the characters can fit in the input area image 61C without being changed in size. By executing the display processing shown in FIG. 9, the editing device 5 can increase the number of characters displayed in the input area image 61C by reducing the size of the characters. In this case, the editing device 5 can increase the number of characters that can be printed on the tape. The size of the characters arranged in the input area image 61C is larger than the first threshold. Therefore, the editing device 5 can prevent the size of the characters from becoming too small and the visibility form decreasing.

Fifth Embodiment

A fifth embodiment will be described. The fifth embodiment is different from the fourth embodiment in the processing of S93 that is the main processing shown in FIG. 14. Other processing is the same as that of the fourth embodiment. Hereinafter, the processing of S93 will be described in detail, and description of other processing will be omitted.

As shown in FIG. 14, when determining that the characters do not fit in the input area image 61C in the orthogonal direction D2 as a result of forming a plurality of rows in response to insertion of the line feed (S91: NO), the CPU 51 advances the processing to S93. When a plurality of line feeds are inserted between the characters in the processing of S89, the CPU 51 deletes a part of the plurality of inserted line feeds (S93). The line feed that is not deleted is in a state of being inserted between the characters. The CPU 51 executes the display processing (see FIGS. 5 and 9) (S95). The display processing executed by the processing of S95 is the same as the display processing shown in FIG. 5.

Figure 20:
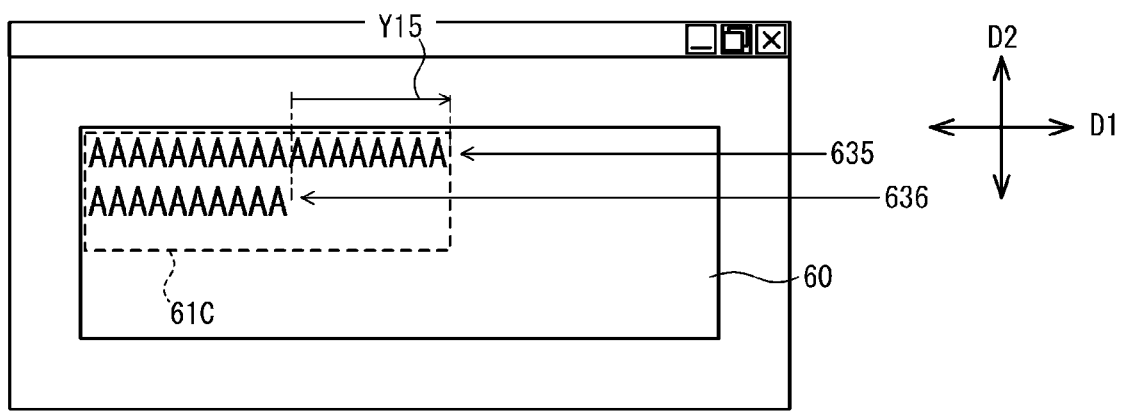
FIG. 20 is a view in which the reduced characters are arranged in the input area image 61C after the rotation.

For example, as shown in FIG. 16, the case where the first row 631 to the fourth row 634 are formed by insertion of the line feeds will be illustrated. In this case, the fourth row 634 does not fit in the input area image 61C and goes rightward out of the input area image 61C. In this case, the CPU 51 rotates the input area image 61C displayed on the display unit 57 by 90 degrees clockwise. The CPU 51 deletes the line feed between the characters of the first row 631 and the characters of the second row 632, and the line feed between the characters of the third row 633 and the characters of the fourth row 634. The line feed between the characters of the second row 632 and the characters of the third row 633 is not deleted. In this case, as shown in FIG. 20, the fifth row 635 in which the first row 631 and the second row 632 (see FIG. 16) are connected, and the sixth row 636 in which the third row 633 and the fourth row 634 (see FIG. 16) are connected are formed.

The CPU 51 displays the characters of the fifth row 635 and the sixth row 636 at the initial size in the rotated input area image 61C. At this time, the fifth row 635 and the sixth row 636 are arranged in the orthogonal direction D2, and the characters of the fifth row 635 and the sixth row 636 are arranged in the arrangement direction D1. The CPU 51 displays the input area image 61C by increasing the length thereof in the arrangement direction D1 so that the characters fit in the input area image 61C in the arrangement direction D1 (see an arrow Y15 in FIG. 20).

Operational Effects of Fifth Embodiment

The same effects as those of the fourth embodiment are obtained. By arranging the characters with a part of the line feeds inserted in the input area image 61, the editing device 5 can approximate arrangement of the characters to arrangement of the input area image 61C before rotation as compared with a case where all the line feeds are deleted.

Sixth Embodiment

A sixth embodiment will be described. The sixth embodiment is different from the first to third embodiments in that the processing of S17 that is the main processing shown in FIG. 4 is not performed. That is, in the sixth embodiment, the CPU 51 does not determine whether the characters having the initial size fit in the input area image 61A in the arrangement direction D1. Therefore, the display processing (see FIGS. 5 and 9) is executed regardless of a size of an area when the characters stored in the RAM 52 are arranged in the arrangement direction D1 at the initial size.

In the display processing shown in FIG. 5, the CPU 51 rotates the input area image 61A displayed on the display unit 57 by 90 degrees clockwise (S37), and displays the characters arranged in the arrangement direction D1 at the initial size in the rotated input area image 61A. At this time, the CPU 51 displays the input area image 61A by increasing the length thereof rightward in the arrangement direction D1 so that the characters fit in the input area image 61A in the arrangement direction D1 (S39).

On the other hand, in the display processing shown in FIG. 9, the CPU 51 calculates a reduced size of the characters which is set so that the characters having the reduced size fit in the input area image 61B in a state that the characters are arranged in the arrangement direction D1 (S53). When determining that the calculated size is smaller than the first threshold (S55: YES), the CPU 51 rotates the input area image 61B displayed on the display unit 57 by 90 degrees clockwise (S61). The CPU 51 displays the reduced characters whose size before reduction is equal to or larger than the first threshold in the input area image 61B rotated by 90° (S63).

Operational Effects of Sixth Embodiment

The same effects as those of the first to third embodiments are obtained. Since the input area image 61A is always rotated by 90 degrees, for example, when the number of characters to be printed is large, an amount of processing required to fit the characters in the input area image 61A can be reduced. Therefore, time required to complete printing by the printing device 4 can be shortened.

<Modification>

The present invention is not limited to the above embodiments, and various modifications can be made. The printing device 4 may attach a transparent cover film to a surface of the thermal paper printed by heating with the thermal head 48. The printing device 4 may perform printing by heating an ink ribbon with the thermal head and transferring ink of the heated ink ribbon to the printing medium. In this case, the printing medium may have a base material on which the ink is transferred, and the thermal paper may not be provided. In addition, the printing device 4 may attach a transparent film so as to overlap a printing surface of the printed base material. Further, after performing printing by transferring the ink of the ink ribbon to the transparent film, the printing device 4 may attach a colored cover film to a printing surface of the transparent film.

The printing device 4 may have an interface connectable to the Internet. The printing device 4 may acquire a program to be executed by the CPU 51 via the Internet and store the program in the flash memory 54.

The above editing processing may be executed by the CPU 51 of the printing device 4. That is, the printing device 4 may generate the print data while editing the layout of the characters, and print on the tape to create a label.

The editing device 5 may store in the flash memory 54 the maximum number of characters that fit in the input area image 61 when the characters having the initial size are arranged in the arrangement direction D1 as a third threshold for each width of the tape. The editing device 5 may determine whether the characters having the initial size fit in the input area image 61 in the arrangement direction D1 by comparing the number of characters with the third threshold.

The editing device 5 may acquire a diameter of the cable C to which the label K created by the printing device 4 is attached. The editing device 5 may calculate a first maximum value of a length of the input area image 61 in the orthogonal direction D2 displayed by the processing of S11, S81 according to the acquired diameter of the cable C. The editing device 5 may prohibit setting that the length of the input area image 61 in the orthogonal direction D2 is equal to or greater than the calculated first maximum value.

When the display processing shown in FIG. 9 is executed, the editing device 5 may set the size of the characters arranged in the input area image 61 after the rotation as the initial size.

The editing device 5 may acquire in advance a second maximum value when the input area image 61 after the rotation is enlarged by the processing of S39, S63. When the processing of S39, S63 are executed, the editing device 5 may enlarge the input area image 61 within a range that is smaller than the acquired second maximum value. When the characters do not fit in the enlarged input area image 61, the size of the characters may be reduced.

The main processing may be executed each time one character is input via the input unit 56. In addition, the main processing may be executed when an operation of adding a new character to the already input character is performed via the input unit 56.

<Others>

The CPU 11 of the editing device 5 is an example of a "controller" according to the present invention. The processing of S11, S81 is an example of "first display processing" according to the present invention. The processing of S17, S87, S91 is an example of "determination processing" according to the present invention. The processing of S37, S61 is an example of "rotation processing" according to the present invention. The processing of S39, S63 is an example of "second display processing" according to the present invention. The processing of S15, S85 is an example of "calculation processing" according to the present invention.

What is claimed is:

1. An editing device comprising:
a controller configured to edit a layout of characters to be printed on an elongated printing medium,
wherein the controller is configured to execute:
overlapping an input area image indicating an input area where the characters are arranged on a medium image indicating the printing medium;
displaying the medium image and the input area image on a display unit in a direction in which a width direction of the printing medium indicated by the medium image and an arrangement direction of the characters in the input area coincide with each other;
determining whether the characters fit in the input area when the characters are arranged in the input area indicated by the input area image displayed in displaying:
when it is determined that the characters do not fit in the input area in the determining, rotating the input area image displayed on the display unit so that the arrangement direction of the characters in the input area coincide with a longitudinal direction of the printing medium indicated by the medium image;
increasing a size of the input area image rotated in the rotating in the arrangement direction so that the characters fit in the input area; and
displaying the input area image increased in size in the increasing and the characters arranged in the input area indicated by the input area image rotated in the rotating.

2. The editing device according to claim 1,
wherein, in the determining, whether the characters arranged in the arrangement direction fit in the input area in the arrangement direction is determined,
wherein, in the displaying of the characters, the characters are arranged in the arrangement direction.

3. The editing device according to claim 2,
wherein the controller is configured to further execute:
when it is determined that the characters do not fit in the input area in the arrangement direction in the determining, calculating a reduction parameter that specifies a reduced size which is set so that the characters having the reduced size fit in the input area when the characters are arranged in the arrangement direction,
wherein, in the rotating, the input area is rotated when the reduction parameter calculated by the calculating satisfies a given condition, and
wherein, in the displaying of the characters, the characters having a size larger than the size specified by the reduction parameter calculated in the calculating are arranged in the arrangement direction in the input area indicated by the input area image rotated in the rotating.

4. The editing device according to claim 3,
wherein, in the calculating, the size of the reduced characters is used as the reduction parameter, and
wherein, in the rotating, when the size of the reduced characters calculated in the calculating is smaller than a first threshold, the input area image is rotated.

5. The editing device according to claim 3,
wherein, in the calculating, a ratio of the size of the characters after reduction with respect to a size of the characters before reduction is used as the reduction parameter, and
wherein, in the rotating, the input area image is rotated when the ratio is smaller than a second threshold.

6. The editing device according to claim 1,
wherein, in the determining, whether a plurality of rows of characters that fit in the input area in a state where the characters are arranged in the arrangement direction fit in the input area in an orthogonal direction orthogonal to the arrangement direction when the characters are arranged in the orthogonal direction, and
wherein, in the displaying of the characters, the characters are arranged in the arrangement direction in the input area indicated by the input area image rotated in the rotating.

7. The editing device according to claim 6,
wherein the controller is configured to further execute:
when it is determined that the rows do not fit in the input area in the orthogonal direction, calculating a reduction parameter that specifies a reduced size which is set so that the characters having the reduced size fit in the input area,
wherein, in the rotating, the input area is rotated when the reduction parameter calculated in the calculating satisfies a given condition, and
wherein, in the displaying of the character, the characters having a size larger than the size specified by the reduction parameter calculated by the calculating are arranged in the arrangement direction in the input area indicated by the input area image rotated in the rotating.

8. The editing device according to claim 7,
wherein, in the calculating, the size of the reduced characters is used as the reduction parameter, and
wherein, in the rotating, when the size of the reduced characters calculated in the calculating is smaller than a first threshold, the input area image is rotated.

9. The editing device according to claim 7,
wherein, in the calculating, a ratio of the size of the characters after reduction with respect to a size of the characters before reduction is used as the reduction parameter, and
wherein, in the rotating, the input area image is rotated when the ratio is smaller than a second threshold.

10. The editing device according to claim 6,
wherein, in the displaying of the character, the characters are arranged in the arrangement direction and the orthogonal direction in the input area indicated by the input area image rotated in the rotating.

11. An editing device comprising:
a controller configured to edit a layout of characters to be printed on an elongated printing medium,
wherein the controller is configured to execute:
overlapping an input area image indicating an input area where the characters are arranged on a medium image indicating the printing medium;
displaying the medium image and the input area image on a display unit in a direction in which a width direction of the printing medium indicated by the medium image and an arrangement direction of the characters in the input area coincide with each other;
calculating a reduction parameter that specifies a reduced size which is set so that the characters having the reduces size fit in the input area when the characters are arranged in the input area indicated by the input area image displayed in the displaying;
when the reduction parameter calculated in the calculating satisfies a given condition, rotating the input area image displayed on the display unit so that the arrangement direction coincide with a longitudinal direction of the printing medium indicated by the medium image;
increasing a size of the input area image rotated in the rotating in the arrangement direction so that the characters fit in the input area; and
displaying the input area image increased in size in the increasing and the characters having a size larger than the size specified by the reduction parameter calculated in the calculating and arranged in the arrangement direction in the input area indicated by the input area image rotated in the rotating.

12. The editing device according to claim 11,
wherein, in the calculating, the size of the reduced characters is used as the reduction parameter, and
wherein, in the rotating, when the size of the reduced characters calculated in the calculating is smaller than a first threshold, the input area image is rotated.

13. The editing device according to claim 11,
wherein, in the calculating, a ratio of the size of the characters after reduction with respect to a size of the characters before reduction is used as the reduction parameter, and
wherein, in the rotating, the input area image is rotated when the ratio is smaller than a second threshold.

14. A printing system comprising:
the editing device according to claim 11; and
a printing device that is configured to print the characters on the printing medium based on the layout edited by the editing device.

15. A printing system comprising:
the editing device according to claim 1; and
a printing device that is configured to print the characters on the printing medium based on the layout edited by the editing device.

16. A control method for editing a layout of characters to be printed on an elongated printing medium, comprising:
overlapping an input area image indicating an input area where the characters are arranged on a medium image indicating the printing medium;

displaying the medium image and the input area image on a display unit in a direction in which a width direction of the printing medium indicated by the medium image and an arrangement direction of the characters in the input area coincide with each other:

determining whether the characters fit in the input area when the characters are arranged in the input area indicated by the input area image displayed in displaying;

when it is determined that the characters do not fit in the input area in the determining, rotating the input area image displayed on the display unit so that the arrangement direction coincide with a longitudinal direction of the printing medium indicated by the medium image;

increasing a size of the input area image in the arrangement direction so that the characters fit in the input area indicated by the input area image; and displaying the input area image increased in size in the increasing and the characters arranged in the input area indicated by the input area image rotated in the rotating.

17. A control method for editing a layout of characters to be printed on an elongated printing medium, comprising:

overlapping an input area image indicating an input area where the characters are arranged on a medium image indicating the printing medium;

displaying the medium image and the input area image on a display unit in a direction in which a width direction of the printing medium indicated by the medium image and an arrangement direction of the characters in the input area coincide with each other;

calculating a reduction parameter that specifies a reduced size which is set so that the characters having the reduced size fit in the input area when the characters are arranged in the input area indicated by the input area image displayed in the displaying;

when the reduction parameter calculated in the calculating satisfies a given condition, rotating the input area image displayed on the display unit so that the arrangement direction coincide with a longitudinal direction of the printing medium indicated by the medium image;

increasing a size of the input area image rotated in the rotating in the arrangement direction so that the characters fit in the input area; and displaying the input area image increased in size in the increasing and the characters having a size larger than the size specified by the reduction parameter calculated in the calculating and arranged in the arrangement direction in the input area indicated by the input area image rotated in the rotating.

* * * * *